UNITED STATES PATENT OFFICE.

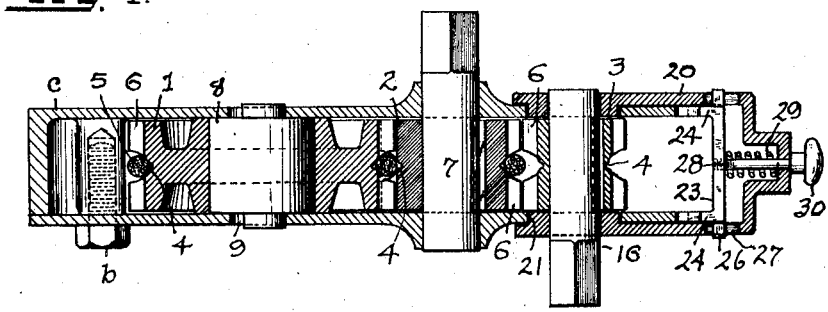
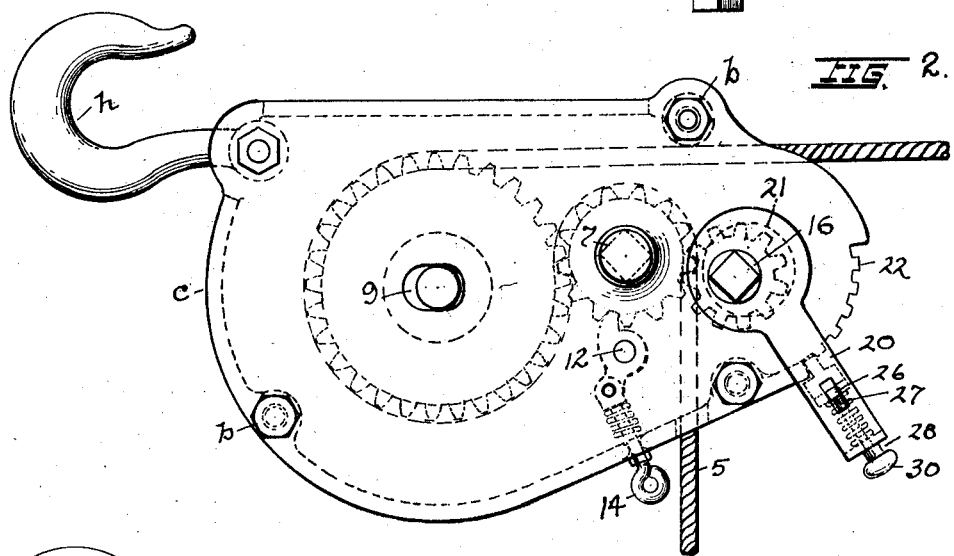
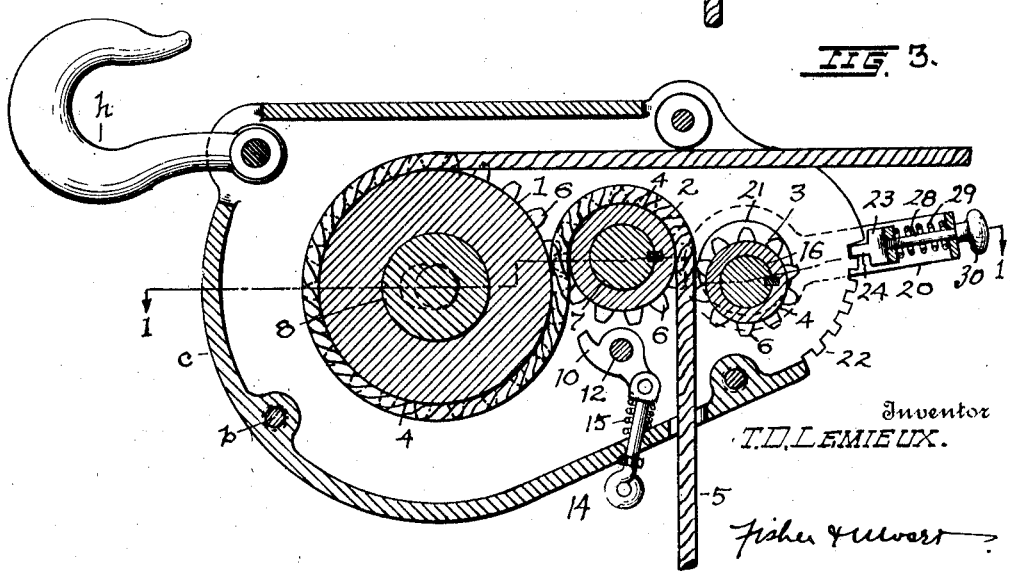

THOMAS D. LEMIEUX, OF LAKEWOOD, OHIO.

CABLE-PULLING DEVICE.

1,328,678.  Specification of Letters Patent.  Patented Jan. 20, 1920.

Application filed August 29, 1919. Serial No. 320,559.

*To all whom it may concern:*

Be it known that I, THOMAS D. LEMIEUX, a citizen of the United States, residing at Lakewood, in the county of Cuyahoga and State of Ohio, have invented certain new and useful Improvements in Cable-Pulling Devices, of which the following is a specification.

The cable pulling device shown herein is especially designed to be used by autoists and truck drivers as a reliable and effective medium for pulling cars or automobiles out of stalled places on the road or where the machine is accidentally ditched or in like trouble and which requires an outside power to extricate the machine from its difficulty. But while this is the main and present object of the device, it is obvious, also, that the device is not thus limited in its use, and that it may be employed for other purposes as well, such as stretching cables or drawing loads other than road machines attached to the cable or operatively connected therewith.

In the accompanying drawings, Figure 1 is a plan view of the device as a whole looking down on line 1—1, Fig. 3. Fig. 2 is a side elevation of the device and Fig. 3 is a sectional elevation thereof on a line centrally through the same.

As thus shown the device has a shell body or casing c in two side parts bound separably together by bolts b, and is provided with a strong hook h having an eye engaged on one of said bolts between the sides of the casing at one end and top thereof and adapted to anchor the device by any intermediate means, such as a rope, chain or the like to a tree, a stump or to any other firmly fixed object from which to make the pull.

Three several gear sheaves or wheels 1, 2 and 3 of different sizes successively are mounted in tandem in the casing and provided with slight annular channels 4 of approximately V shape about the periphery thereof for the cable or rope 5, and gears 6 at each side of said channels or grooves adapted to intermesh at certain adjustments of said wheels, and particularly of the major wheel 1 and the minor wheel 3 in respect to the intermediate wheel 2. The latter wheel has a shaft 7 on which it is splined and the said shaft is limited to a rotary movement in its bearings on the casing.

The wheel 1 has a hub 8 provided with short bearings set in oblong slots 9 in the casing and adapting the wheel to be moved back and forth within limits into and out of working relations with the intermediate wheel 2, and said slots are of such length as to provide all needed movement of said wheel in respect to wheel 2 to make effective working engagement on ropes or cables of different thickness and to which the gears or gear teeth are supposed to have the necessary accommodation.

The shaft 7 has one end projected laterally beyond the casing and constructed to engage a crank handle therewith, not shown, and for quick pulls up to a certain tension or load the two wheels 1 and 2 usually suffice, the binding effect between said wheels on the cable in the shallow channels serving to make working or pulling engagement. A dog 10 is provided for wheel 2 to engage the teeth thereof and lock and hold the wheels when rotation through crank shaft 7 is suspended, and said dog or pawl is pivoted at 12 and controlled by stem 14 pivotally connected therewith and on which stem there is a spring 15 adapted to hold the dog in engaging relations when it is swung into corresponding position, and which also is shown as past the dead center point on pivot 12. An outward pull on the said stem or rod releases the dog and relaxes the cable.

For the purposes of a greater tension or pull on the cable than the first two wheels may afford and for greater ease of operation, I have provided the smaller gear 3 which is splined or otherwise fixed on shaft 16 adapted to be engaged at one end by a crank as in the case of shaft 7 but having its crank end on the opposite side of the casing from shaft 7 to afford freedom of action. The said shaft 16 is mounted in a yoke 20, embracing the sides of the casing and provided with eccentric bearings 21 occupying circular openings in the sides of the casing and having the shaft 16 extending through the said bearings. The said yoke is free to swing on said bearings in something of an arc around the end of the casing and to such extent that in one position the wheel 3 on said shaft will be thrown into mesh with wheel 2 and also come into gripping relations with the cable, as in Fig. 2, and in the other or reverse position will be out of such mesh and grip and free, as in Fig. 3. The arc shaped edges of the casing have a series of teeth 22, and a locking device 23 for yoke 20 is mounted in said yoke and has teeth 24 adapted to engage in the teeth 22, thus holding the yoke in any adjusted position. The said locking device or pawl has side lugs 26 slidably supported in slots 27 in the casing and is actuated by means of a stem 28 rigid with the middle thereof and slidable in the middle cross portion of the yoke, a spring 29 being fixed on said stem and adapted to exert a constant inward pressure on the pawl. A knob 30 or the like on the outer end of the stem enables the same to be gripped to withdraw the pawl to swing the yoke.

Any suitable configuration can be given the grooves or channels in the said sheaves to make effectual engagement with the cable, and I have found the small sheave 3 especially useful initially to pull the cable into taut relations, after which operation may proceed through either shaft 7 or 16, according to the load. Obviously, the lighter loads drawn by sheaves 1 and 2 have also a more rapid operation than is possible by operating through the small sheave but it is also possible to pull loads through or by means of the small gear which cannot possibly be drawn by gears 1 and 2 alone. This gives this particular device its distinguishing value and advantage over all others with which I am familiar.

It will be noticed that in any event the major or large wheel will come into mesh with the middle wheel when a pulling operation occurs because the cable is first drawn around said wheel or sheave and then threaded upward and over the middle wheel and then down between the same and the smallest wheel or sheave, and out through the bottom of the casing. Any perceptible tension on the cable when threaded through the device in this way will automatically pull the large wheel into mesh if it is out and comparatively little pulling tension will tighten the cable frictionally in said wheels and with increased tightening as the pull becomes harder. It is planned that there shall be no slipping of the cable in the sheaves, and none actually occurs with this construction of device, and the dog 10, or its equivalent, serves to lock the parts against reverse rotation.

What I claim is:

1. A cable pulling device comprising a casing and a series of gear sheaves of different sizes in tandem therein, the middle of said sheaves being on fixed bearings and the outer sheaves having shifting bearings in respect to said inner sheave.

2. A cable pulling device comprising a casing and three several gear sheaves in tandem therein and the first of said sheaves of relatively large size and the other two of smaller sizes successively, and each of said smaller sheaves provided with a shaft adapted to be engaged by means to rotate the same.

3. A cable pulling device having a casing and three sheaves of different sizes successively therein having gears on their periphery adapted to mesh and channels between said gears, the largest of said gears being adapted to slide into mesh and the smallest gear adapted to be rotated into mesh.

4. A cable pulling device having a casing and three gear sheaves of different sizes successively therein, the first of said sheaves being the largest and adapted to automatically come into mesh with the next gear, and a yoke having eccentric bearings in which the smallest of said sheaves is mounted and adapted to be thrown into and out of mesh by rotating said yoke.

5. A cable pulling device having a casing and three gear sheaves mounted between the sides thereof and of different sizes successively and having annular grooves at their periphery, the largest sheave having bearings slidable in slots in the casing; the middle sheave having fixed bearings and the smallest sheave mounted in eccentric bearings, the latter sheave and the middle sheave each having shafts adapted to be engaged with means to manually rotate the same and all said sheaves in meshing relations.

6. A cable pulling device having a casing and a series of three sheaves therein adapted to mesh and provided with peripheral grooves to engage a cable between them, the last of said gears being the smallest, a yoke having eccentric bearings mounted in circular openings in the sides of the casing and a shaft for said smallest gear mounted in said bearings and means on said yoke adapted to engage said casing at intervals and fix the yoke in different positions in respect to the casing to change the position of said smallest sheave in respect to the middle sheave.

Signed at Cleveland, in the county of Cuyahoga, and State of Ohio, this 8th day of July 1919.

THOMAS D. LEMIEUX.